(12) United States Patent
Matsuoka

(10) Patent No.: US 10,288,149 B2
(45) Date of Patent: May 14, 2019

(54) TRANSMISSION DEVICE

(71) Applicant: MUSASHI SEIMITSU INDUSTRY CO., LTD., Toyohashi-shi, Aichi (JP)

(72) Inventor: Shinya Matsuoka, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 15/576,554

(22) PCT Filed: Jun. 6, 2016

(86) PCT No.: PCT/JP2016/066717
§ 371 (c)(1),
(2) Date: Nov. 22, 2017

(87) PCT Pub. No.: WO2016/199707
PCT Pub. Date: Dec. 15, 2016

(65) Prior Publication Data
US 2018/0149236 A1    May 31, 2018

(30) Foreign Application Priority Data
Jun. 8, 2015    (JP) .................................. 2015-115525

(51) Int. Cl.
*F16H 1/32*    (2006.01)
*F16H 25/06*    (2006.01)
*F16H 48/10*    (2012.01)

(52) U.S. Cl.
CPC .............. *F16H 1/32* (2013.01); *F16H 25/06* (2013.01); *F16H 48/10* (2013.01); *F16H 2001/327* (2013.01); *F16H 2025/063* (2013.01)

(58) Field of Classification Search
CPC . F16H 48/10; F16H 1/32; F16H 25/06; F16H 2025/063; F16H 2001/327
See application file for complete search history.

(56) References Cited

U.S. PATENT DOCUMENTS 1,867,492 A * 7/1932 Konrad ..................... F16H 1/32
475/168
4,604,916 A * 8/1986 Distin, Jr. ................. F16H 1/32
475/168
(Continued)

FOREIGN PATENT DOCUMENTS

DE    3203229 A1 *  8/1983 ............. F16H 25/06
JP    H06-47756 U    6/1994
(Continued)

*Primary Examiner* — Jacob S. Scott
*Assistant Examiner* — Lillian T Nguyen
(74) *Attorney, Agent, or Firm* — Carrier Blackman & Associates, P.C.; Joseph P. Carrier; Fulchand P. Shende

(57) ABSTRACT

A transmission device is provided in which a first speed change portion and a second speed change portion are formed. The first speed change portion includes an eccentric shaft having a main shaft portion on a first rotary axis and an eccentric shaft portion on a second rotary axis disposed eccentrically with respect to the first rotary axis; an eccentric unit that is rotatably supported on the eccentric shaft portion, and has external teeth formed on an outer peripheral portion thereof; and a housing having an axial center on the first rotary axis, and having internal teeth that mesh with the external teeth of the eccentric unit. The second speed change portion includes curved wave grooves respectively formed on the eccentric unit and a rotary unit; and rolling elements sandwiched between the curved wave grooves and moving along an orbit defined by the curved wave grooves.

4 Claims, 4 Drawing Sheets

(56) References Cited

U.S. PATENT DOCUMENTS

| | | | |
|---|---|---|---|
| 4,643,047 A * | 2/1987 | Distin | F16H 25/06 |
| | | | 475/168 |
| 5,197,930 A * | 3/1993 | Imase | F16H 25/06 |
| | | | 475/168 |
| 5,286,236 A * | 2/1994 | Hosokawa | F16H 25/06 |
| | | | 475/168 |
| 5,498,215 A | 3/1996 | Hosokawa et al. | |
| 5,683,323 A | 11/1997 | Imase | |
| 8,162,790 B2 * | 4/2012 | Imase | F16H 1/32 |
| | | | 475/164 |
| 8,517,878 B2 * | 8/2013 | Nagumo | F16H 1/32 |
| | | | 475/163 |
| 2011/0319218 A1 | 12/2011 | Imase et al. | |
| 2015/0219186 A1 * | 8/2015 | Kong | F16H 25/06 |
| | | | 475/168 |

FOREIGN PATENT DOCUMENTS

| | | |
|---|---|---|
| JP | H09-26011 A | 1/1997 |
| JP | 2009-121494 A | 6/2009 |
| JP | 4814351 B2 | 11/2011 |
| JP | 2012-026568 A | 2/2012 |

\* cited by examiner

TRANSMISSION DEVICE

TECHNICAL FIELD

The present invention relates to a transmission device mainly applied to a vehicle.

BACKGROUND ART

As disclosed in Patent Documents 1 and 2 below, a transmission device including an eccentric shaft, an eccentric unit and a rotary unit as follows is already known. The eccentric shaft includes a main shaft portion on a first rotary axis and an eccentric shaft portion on a second rotary axis disposed eccentrically with respect to the first rotary axis. The eccentric shaft portion is capable of revolving about the first rotary axis. The eccentric unit is rotatably supported on the eccentric shaft portion of the eccentric shaft and is capable of revolving about the first rotary axis, while rotating around the second rotary axis in a manner of being operatively associated with the rotation of the eccentric shaft about the first rotary axis. The rotary unit is capable of rotating about the first rotary axis, while being operatively associated with the axial rotation and the orbital revolution of the eccentric unit. In the transmission device, rotation of the main shaft portion of the eccentric shaft is transmitted to the rotary unit with speed reduced via a curved wave groove and a plurality of intermediate members having an orbit restricted by the curved wave groove.

Specifically, the arrangement disclosed in Patent Document 1 includes an eccentric rotary unit (eccentric unit) 4 rotatably supported on an eccentric shaft 22 of an eccentric shaft that includes an input shaft (main shaft portion) 2 extending along a first rotary axis and the eccentric shaft (eccentric shaft portion) 22 extending along a second rotary axis. The arrangement further includes a plurality of rolling balls (rolling elements) 53 that move along an orbit defined by an inner groove (curved wave groove) 51 in an outer periphery of the eccentric rotary unit 4 and an outer groove (curved wave groove) 52 in an inner periphery of a housing 1. The movement of the rolling balls 53 along the orbit causes the eccentric rotary unit 4 to revolve about the first rotary axis, while rotating around the second rotary axis, in a manner of being operatively associated with rotation of the input shaft 2. The arrangement further includes a driven disk (rotary unit) 32 that includes an adjustment mechanism 40 disposed on a side surface opposing one side surface of the eccentric rotary unit 4. The driven disc 32 rotates about the first rotary axis on the basis of the axial rotation and the orbital revolution of the eccentric rotary unit 4. (It is noted that the reference numerals and symbols used in the description of Patent Document 1 refer to those used in Patent Document 1.) Further, Patent Document 2 discloses an arrangement that includes an eccentric plate (eccentric unit) 4 rotatably supported on an eccentric shaft 12 that includes an input shaft portion (main shaft portion) 12a extending along a first rotary axis and an eccentric portion (eccentric shaft portion) 12d extending along a second rotary axis. The arrangement further includes a plurality of first rolling balls (rolling elements) 10 that move along an orbit defined by an epicycloidal groove portion (curved wave groove) 7 in one side surface of the eccentric plate 4 and a hypocycloidal groove (curved wave groove) 6 in a side surface of a stationary plate 3 that opposes the eccentric plate 4. The movement of the first rolling balls 10 along the orbit causes the eccentric plate 4 to revolve about the first rotary axis, while rotating around the second rotary axis, in a manner of being operatively associated with rotation of the input shaft portion 12a. The arrangement further includes a plurality of second rolling balls (rolling elements) 11 that move along an orbit defined by a hypocycloidal groove portion (curved wave groove) 8 in the other side surface of the eccentric plate 4 and a epicycloidal groove (curved wave groove) 9 in a side surface of an output plate (rotary unit) 5 that opposes the eccentric plate 4, on the basis of the axial rotation and the orbital revolution of the eccentric plate 4. The movement of the second rolling balls 11 along the orbit causes the output plate 5 to rotate about the first rotary axis in a manner of being operatively associated with the axial rotation and the orbital revolution of the eccentric plate 4. (It is noted that the reference symbols used in the description of Patent Document 2 refer to the reference symbols used in Patent Document 2.)

PRIOR ART DOCUMENTS

Patent Documents

Patent Document 1: Japanese Patent Application Laid-open No. 9-26011
Patent Document 2: Japanese Patent No. 4814351

SUMMARY OF THE INVENTION

Problems to be Solved by the Invention

In the transmission device disclosed in Patent Document 1, however, the rotation of the input shaft 2 is converted into the axial rotation and the orbital revolution of the eccentric rotary unit 4 by the curved wave groove 51 formed in the outer periphery of the eccentric rotary unit 4, the curved wave groove 52 formed in the inner periphery of the housing 1 so as to oppose the eccentric rotary unit 4, and the rolling balls 53 that roll along the orbit defined by the two curved wave grooves 51 and 52. The two curved wave grooves 51 and 52 thus increase a radial size of the transmission device. Additionally, the adjustment mechanism 40 is not to change speeds resulting in a single speed change stage and a high transmission ratio cannot be acquired from the single speed change stage.

With the transmission device disclosed in Patent Document 2, despite a plurality of speed change stages available, the curved wave grooves 7 and 8 formed in the opposite side surfaces of the eccentric plate 4 and the curved wave groove 6 formed in the side surface of the stationary plate 3 disable thinning of a wall thickness of the eccentric plate 4 and the stationary plate 3. In addition, the rolling balls 10 and 11 disposed between the eccentric plate 4 and the stationary plate 3, and between the eccentric plate 4 and the output plate 5, inevitably increase an axial size of the transmission device. Furthermore, the use of the many rolling balls 10 and 11 increases not only the number of parts used, but also weight of the transmission device as a whole.

The present invention has been accomplished in light of such circumstances and it is an object thereof to provide a transmission device capable of having a speed change portion with a plurality of speed change stages without involving an increased size of the transmission device as a whole, while achieving reduction in the number of parts used and weight.

Means for Solving the Problems

In order to attain the above object, according to the present invention, there is provided a transmission device comprising: an eccentric shaft including a main shaft portion on a first rotary axis and an eccentric shaft portion on a second rotary axis disposed eccentrically with respect to the first rotary axis, the eccentric shaft portion being capable of revolving about the first rotary axis; an eccentric unit supported rotatably on the eccentric shaft portion and capable of revolving about the first rotary axis while rotating around the second rotary axis, the eccentric unit having external teeth formed on an outer peripheral portion thereof; a housing having an axial center on the first rotary axis and having internal teeth meshing with the external teeth of the eccentric unit on an inner peripheral wall thereof; a rotary unit capable of rotating about the first rotary axis and having one side surface opposed to one side surface of the eccentric unit; curved wave grooves formed in the one side surface of the eccentric unit and the one side surface of the rotary unit, respectively; and a plurality of rolling elements sandwiched between the curved wave grooves and moving along an orbit defined by the curved wave grooves, wherein at least the eccentric shaft, the eccentric unit and the housing form a first speed change portion and at least the eccentric unit, the rotary unit and the rolling elements form a second speed change portion, and the first and second speed change portions cause rotation of either one of the main shaft portion of the eccentric shaft or the rotary unit to be transmitted to the other of the main shaft portion of the eccentric shaft or the rotary unit with reduced or increased speed. (This is a first aspect.)

Further, preferably, the curved wave groove of the eccentric unit has waves that are greater in number than waves of the curved wave groove of the rotary unit. (This is a second aspect.)

Furthermore, preferably, the eccentric unit has a first thin-wall portion formed on the one side surface on an outer peripheral side with respect to the curved wave groove and a second thin-wall portion formed on the other side surface of the eccentric unit, and when viewed in a plane of projection perpendicular to the first rotary axis, the second thin-wall portion has an area greater than an area of the first thin-wall portion. (This is a third aspect.)

Effects of the Invention

In accordance with the first aspect of the present invention, the first speed change portion includes: the eccentric shaft that includes the main shaft portion on the first rotary axis and the eccentric shaft portion on the second rotary axis disposed eccentrically with respect to the first rotary axis, the eccentric shaft portion being capable of revolving about the first rotary axis; the eccentric unit that is supported rotatably on the eccentric shaft portion and is capable of revolving about the first rotary axis while rotating around the second rotary axis, the eccentric unit having the external teeth formed on the outer peripheral portion thereof; and the housing having an axial center on the first rotary axis and having internal teeth meshing with the external teeth of the eccentric unit on the inner peripheral wall thereof; and the second speed change portion includes: the curved wave grooves each formed in the one side surface of the eccentric unit and the one side surface of the rotary unit, opposing the eccentric unit; and a plurality of the rolling elements that are sandwiched between the curved wave grooves and that move along the orbit defined by the curved wave grooves. Thus, despite the plurality of speed change stages formed from the first and second speed change portions, only the one side surface of the eccentric unit is required to have the curved wave groove of the eccentric unit and the housing is not required to have the curved wave groove. Thus, the eccentric unit and the housing can have a thin wall thickness, so that the transmission device can have a shorter axial length and reduced weight. In addition, the first speed change portion is formed such that the external teeth, protruding radially a short distance, of the eccentric unit and the internal teeth, protruding radially a short distance, of the housing engage each other and such that the curved wave grooves that extend to meander largely in the radial direction are not to engage each other across the rolling elements. The first speed change portion thus does not lead to a transmission device having an increased size in the radial direction. Additionally, the curved wave groove formed in the eccentric unit is formed utilizing a side surface as a dead material portion of the eccentric unit having the external teeth on the outer peripheral portion thereof. This arrangement makes effective use of the dead material portion and contributes to reduced weight of the eccentric unit.

In accordance with the second aspect of the present invention, the curved wave groove of the eccentric unit has waves that are greater in number than waves of the curved wave groove of the rotary unit. The number of waves of the curved wave groove formed in the one side surface requiring a predetermined area or greater for effecting axial rotation and orbital revolution of the eccentric unit can be made more than the number of waves of the curved wave groove of the rotary unit. This arrangement makes even more effective use of the one side surface of the eccentric unit and enables reduction in diameter and size of the rotary unit.

In accordance with the third aspect of the present invention, the eccentric unit has the first thin-wall portion formed on the one side surface on the outer peripheral side with respect to the curved wave groove and the second thin-wall portion formed on the other side surface of the eccentric unit. Thus, the first and second thin-wall portions achieve further reduction in weight of the eccentric unit. Additionally, when viewed in a plane of projection perpendicular to the first rotary axis, the second thin-wall portion has an area greater than the area of the first thin-wall portion. The area of the second thin-wall portion in the other side surface having no curved wave groove is further increased to achieve further reduction in weight.

EXPLANATION OF REFERENCE NUMERALS AND SYMBOLS

Figure 1:
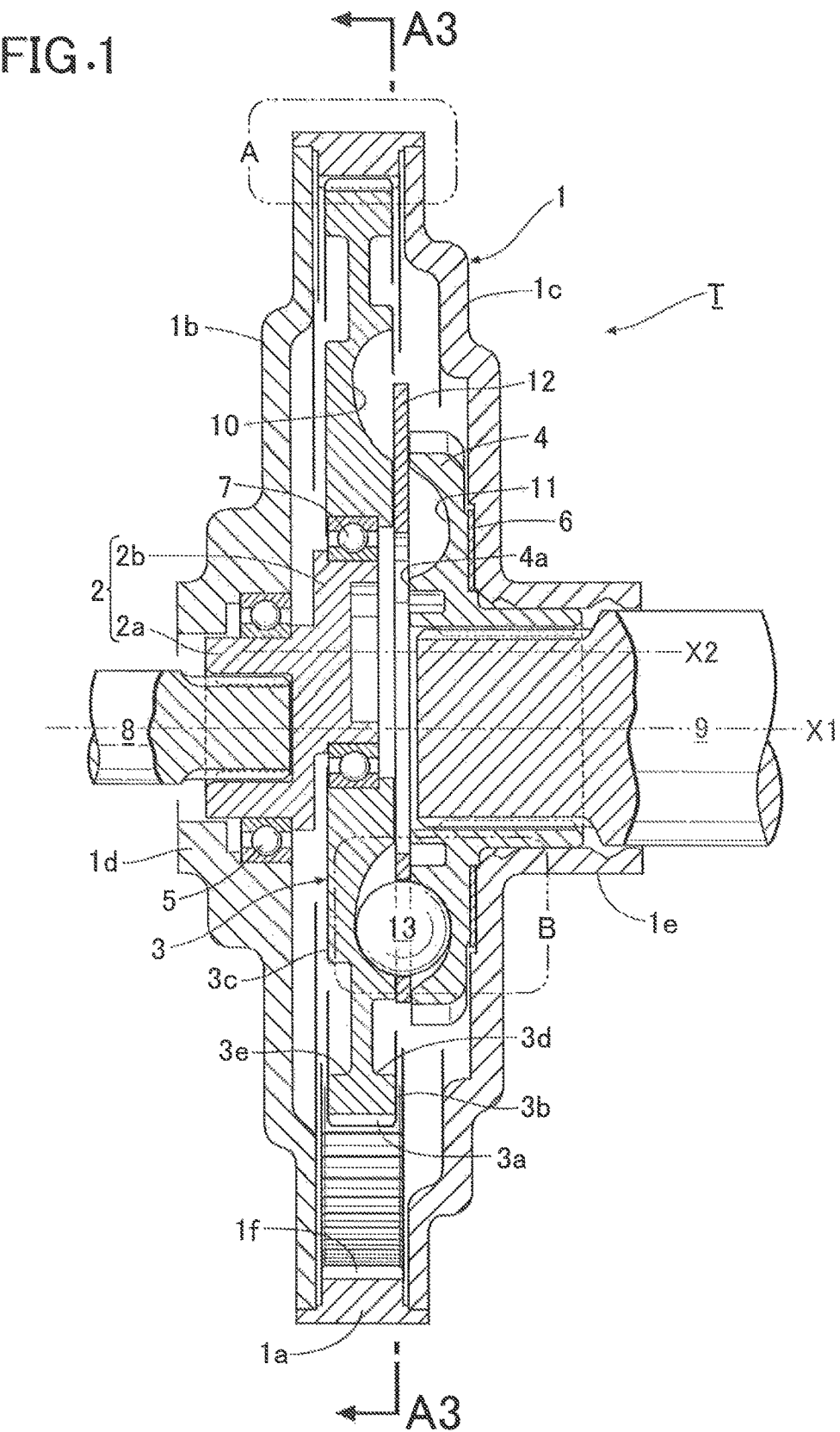
FIG. 1 is a longitudinal cross-sectional front view of a transmission device according to a first embodiment of the present invention.

1 Housing
1*f* Internal teeth
2 Eccentric shaft
2*a* Main shaft portion
2*b* Eccentric shaft portion
3 Eccentric unit 3a External teeth
3b One side surface of eccentric unit
3c Other side surface of eccentric unit
3d First thin-wall portion
3e Second thin-wall portion
4 Rotary unit
4a One side surface of rotary unit
10 Curved wave groove of eccentric unit
11 Curved wave groove of rotary unit
13 Rolling element
A First speed change portion
B Second speed change portion
X1 First rotary axis
X2 Second rotary axis

MODE FOR CARRYING OUT THE INVENTION

Modes for carrying out the present invention are explained below by reference to the attached drawings.

First Embodiment

A transmission device according to a first embodiment of the present invention will be described below with reference to FIGS. 1 to 3.

In FIG. 1, a transmission device T according to the first embodiment includes a housing 1, an eccentric shaft 2, an eccentric unit 3, and a rotary unit 4. The housing 1 includes a short cylindrical portion 1a that is integrated with a pair of left and right covering portions 1b and 1c that close open portions on axially opposite sides of the cylindrical portion 1a. The eccentric shaft 2, the eccentric unit 3 and the rotary unit 4 are housed in the housing 1.

The eccentric shaft 2 includes a main shaft portion 2a and an eccentric shaft portion 2b. The main shaft portion 2a is capable of rotating about a first rotary axis X1. The eccentric shaft portion 2b is disposed on a second rotary axis X2 that is eccentric with respect to the first rotary axis X1. The eccentric shaft portion 2b is capable of revolving about the first rotary axis X1.

One covering portion 1b of the housing 1 includes a cylindrical first boss portion 1d that has its axial center on the first rotary axis X1. The other covering portion 1c of the housing 1 includes a cylindrical second boss portion 1e that has its axial center on the first rotary axis X1. The main shaft portion 2a of the eccentric shaft 2 is rotatably supported on the inside of the first boss portion 1d via a first bearing 5. The rotary unit 4 is rotatably supported on the inside of the second boss portion 1e. Additionally, a thrust washer 6 is disposed between the other covering portion 1c and the rotary unit 4.

The eccentric unit 3 having external teeth 3a formed on an outer peripheral portion thereof is rotatably supported on the eccentric shaft portion 2b via a second bearing 7. Additionally, the cylindrical portion 1a having its axial center on the first rotary axis X1 has internal teeth 1f formed on an inner peripheral wall thereof. The internal teeth 1f mesh with the external teeth 3a of the eccentric unit 3. Thus, rotating the eccentric shaft 2 about the first rotary axis X1 causes the eccentric unit 3 having the external teeth 3a in mesh with the internal teeth 1f of the cylindrical portion 1a to revolve about the first rotary axis X1, while rotating around the second rotary axis X2. In contrast, revolving the eccentric unit 3 about the first rotary axis X1, while allowing the eccentric unit 3 to rotate around the second rotary axis X2, causes the eccentric shaft 2 to rotate about the first rotary axis X1.

A first rotary shaft 8 is spline-connected to the main shaft portion 2a of the eccentric shaft 2. A second rotary shaft 9 is spline-connected to the rotary unit 4. Thus, rotation from an outside is transmitted from one of the first and second rotary shafts 8 and 9 to the main shaft portion 2a of the eccentric shaft 2 and the rotary unit 4, and rotation of the main shaft portion 2a of the eccentric shaft 2 and the rotary unit 4 is transmitted to the outside from the other of the first and second rotary shafts 8 and 9.

Figure 2:
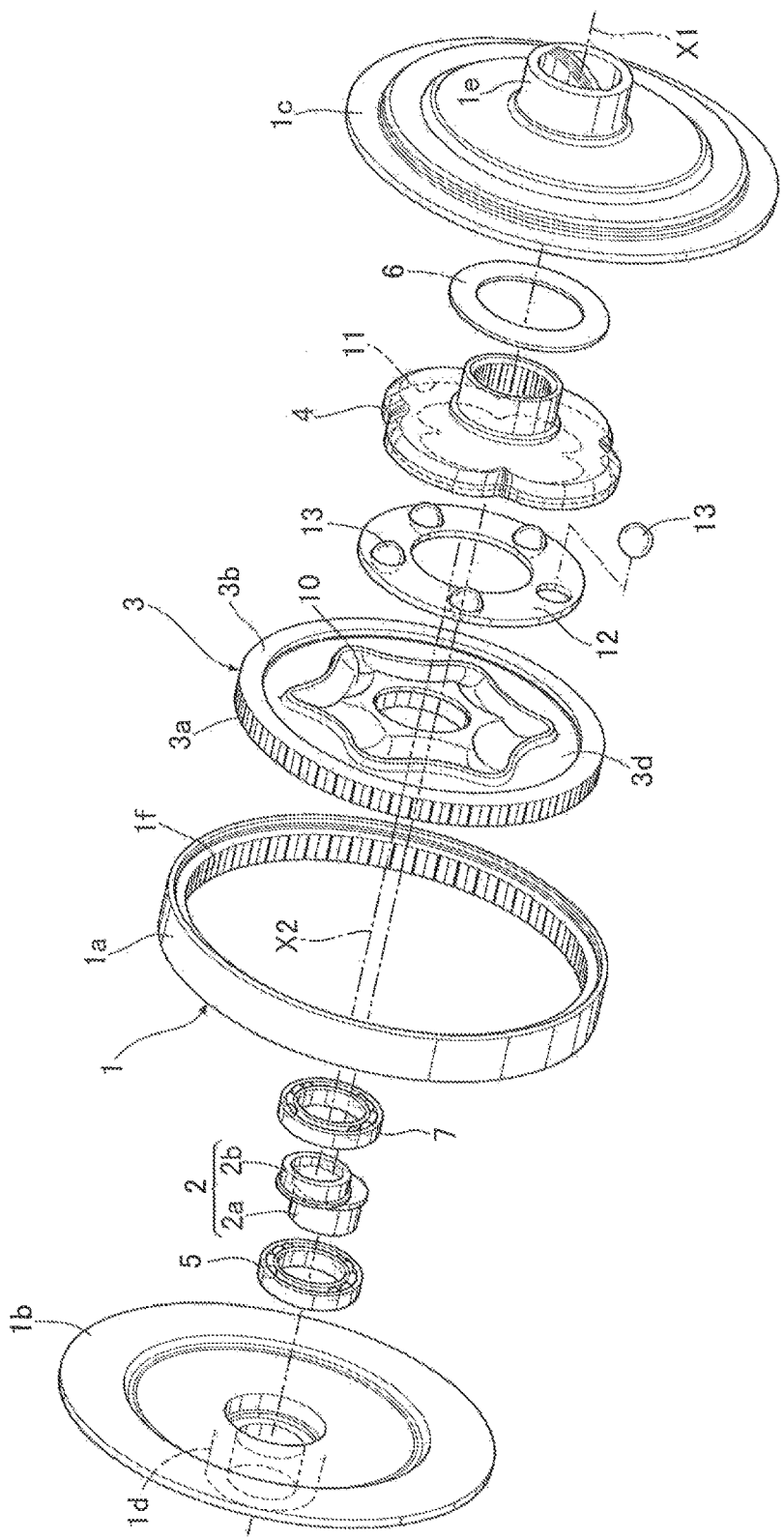
FIG. 2 is a schematic view of the transmission device in FIG. 1.
Figure 3:
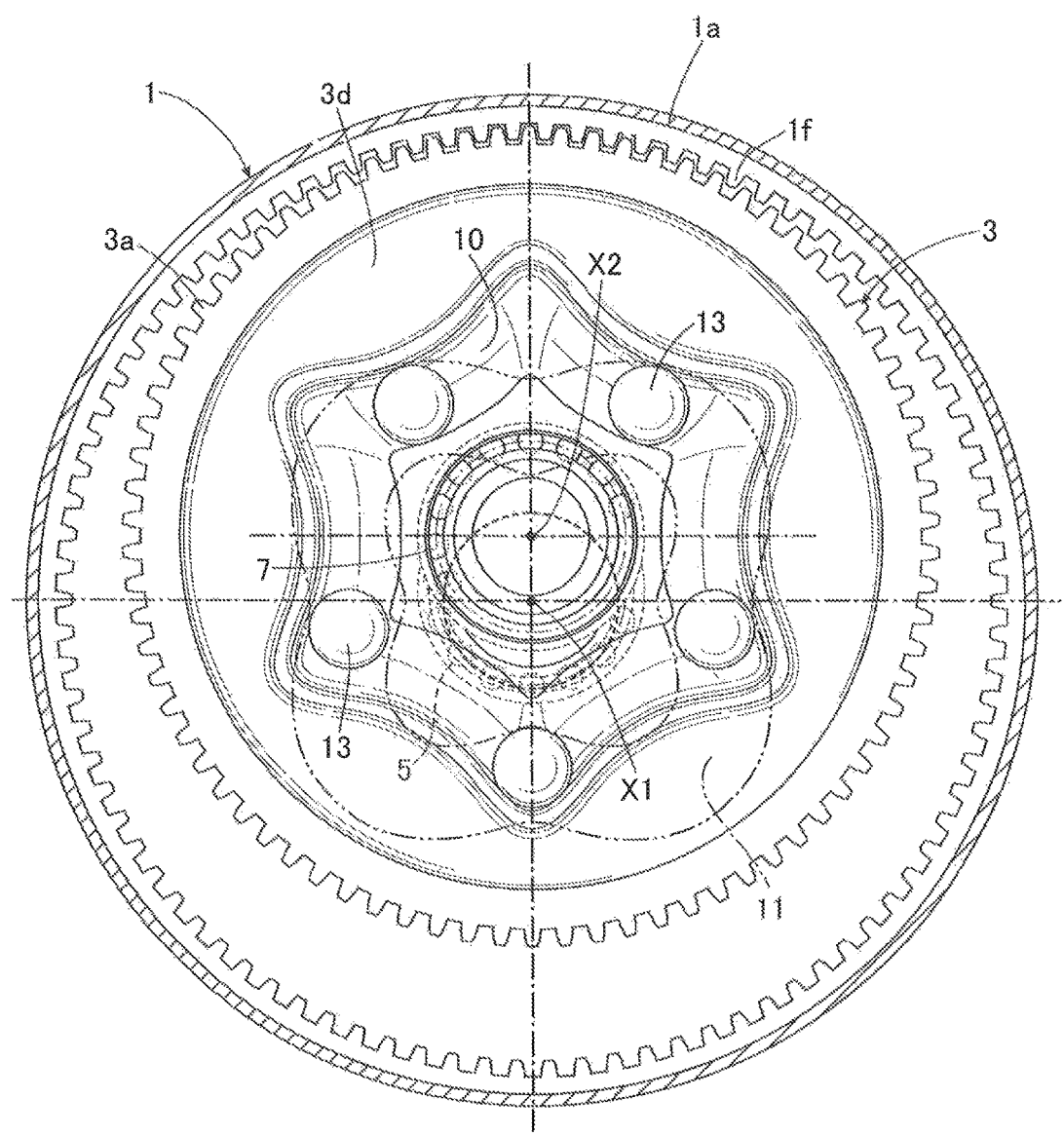
FIG. 3 is a cross-sectional view from arrowed line A3-A3 in FIG. 1.

Reference is also made to FIG. 2 as a schematic view and FIG. 3 as a cross-sectional view from arrowed line A3-A3 in FIG. 1. The rotary unit 4 has one side surface 4a opposing one side surface 3b of the eccentric unit 3. The one side surface 3b of the eccentric unit 3 and the one side surface 4a of the rotary unit 4 have a curved wave groove 10 and a curved wave groove 11 formed therein, respectively. The curved wave groove 10 and the curved wave groove 11 each extend in a peripheral direction along a trochoidal curve. A plurality of ball-shaped rolling elements 13 held in a race member 12 are disposed between the two curved wave grooves 10 and 11 so as to move along the orbit sandwiched between, and defined by, the two curved wave grooves 10 and 11.

Thus, when the eccentric unit 3 revolves about the first rotary axis X1 while rotating around the second rotary axis X2, a position at which the two curved wave grooves 10 and 11 face each other moves. Then, the rolling elements 13 sandwiched between the two curved wave grooves 10 and 11 move and rotate as the position at which the two curved wave grooves 10 and 11 face each other moves. This action causes the rotary unit 4 to rotate about the first rotary axis X1. In contrast, when the rotary unit 4 is rotated about the first rotary axis X1, the eccentric unit 3 revolves about the first rotary axis X1 while rotating around the second rotary axis X2.

Additionally, a first thin-wall portion 3d is formed on the one side surface 3b of the eccentric unit 3 on an outer peripheral side with respect to the curved wave groove 10. A second thin-wall portion 3e is formed on the other side surface 3c of the eccentric unit 3. When viewed in a plane of projection perpendicular to the first rotary axis X1, the second thin-wall portion 3e has an area greater than an area of the first thin-wall portion 3d.

In the first embodiment, the number of internal teeth 1f formed on the inner peripheral wall of the cylindrical portion 1a is 80, the number of external teeth 3a that are formed on the outer peripheral portion of the eccentric unit 3 and that are in mesh with the internal teeth 1f is 70, the curved wave groove 10 formed in the one side surface 3b of the eccentric unit 3 forms a hypotrochoid wave groove having six waves, the curved wave groove 11 formed in the one side surface 4a of the rotary unit 4 forms an epitrochoid wave groove having four waves, and the number of rolling elements 13 held between the two curved wave grooves 10 and 11 is 5. Thus, as will be described later, rotation input from the first rotary shaft 8 is subjected to speed reduction to 5/7 and the rotation is reversed and output from the second rotary shaft 9.

It should, however, be noted that the numbers of external teeth, internal teeth and curved wave grooves are not limited in the first embodiment. For example, the number of internal teeth 1f formed on the inner peripheral wall of the cylindrical portion 1a and the number of external teeth 3a formed on the outer peripheral portion of the eccentric unit 3 may be set to any number. In addition, the numbers of the curved wave grooves 10 and 11 may be set to any number if a difference in the number of waves between the curved wave grooves 10 and 11 is set to 2. Alternatively, the number of waves of the curved wave groove 11 formed in the one side surface 4a of the rotary unit 4 may be greater than the number of waves of the curved wave groove 10 formed in the one side surface 3b of the eccentric unit 3 as in the second embodiment to be described later.

When the number of internal teeth on the inner peripheral wall of the cylindrical portion is Z1, the number of external teeth on the outer peripheral portion of the eccentric unit is Z2, the curved wave groove formed in the one side surface of the eccentric unit is Z3 and the curved wave groove formed in the one side surface of the rotary unit is Z4, a transmission ratio between the main shaft portion of the eccentric shaft and the rotary unit in the mechanism as described above is given by the following expression: $[1-\{(Z1 \times Z3)/(Z2 \times Z4)\}]$. In the first embodiment, Z1=80, Z2=70, Z3=6 and Z4=4, and a reduction ratio when the first rotary shaft 8 is an input shaft is −5/7. Thus, the rotation input from the first rotary shaft 8 is transmitted from the main shaft portion 2a to the rotary unit 4 as a reversed rotation having speed reduced to 5/7 and output from the second rotary shaft 9.

Operation of the first embodiment will be described below.

A first speed change portion A includes at least the eccentric shaft 2, the eccentric unit 3 and the housing 1. The eccentric shaft 2 includes the main shaft portion 2a on the first rotary axis X1 and the eccentric shaft portion 2b on the second rotary axis X2 disposed eccentrically with respect to the first rotary axis X1. The eccentric shaft portion 2b is capable of revolving about the first rotary axis X1. The eccentric unit 3 is supported rotatably on the eccentric shaft portion 2b and is capable of revolving about the first rotary axis X1 while rotating around the second rotary axis X2. The eccentric unit 3 has the external teeth 3a formed on the outer peripheral portion thereof. The housing 1 has the internal teeth 1f meshing with the external teeth 3a of the eccentric unit 3, formed on the inner peripheral wall of the cylindrical portion 1a that has its axial center on the first rotary axis X1. A second speed change portion B includes at least the curved wave groove 10, the curved wave groove 11 and the rolling elements 13. The curved wave groove 10 includes a hypotrochoidal curve formed on the one side surface 3b of the eccentric unit 3. The curved wave groove 11 includes an epitrochoidal curve formed on the one side surface 4a of the rotary unit 4, opposing the one side surface 3b of the eccentric unit 3. The rolling elements 13 move along the orbit sandwiched between, and defined by, the two curved wave grooves 10 and 11. Thus, despite the plurality of speed change stages of the first and second speed change portions A and B, only the one side surface 3b of the eccentric unit 3 is required to have the curved wave groove 10 of the eccentric unit 3, and the covering portion 1b as one of the covering portions of the housing 1 is not required to have the curved wave groove, so that the eccentric unit 3 and the covering portion 1b can have a thin wall thickness. Thus, the transmission device can have a short axial length and reduced weight. In addition, the first speed change portion A is formed such that the external teeth 3a, protruding radially a short distance, of the eccentric unit 3 and the internal teeth 1f, protruding radially a short distance, of the cylindrical portion 1a of the housing 1 engage each other and such that the curved wave grooves that extend to meander largely in the radial direction are not to engage each other across the rolling elements. The first speed change portion A thus does not lead to a transmission device having an increased size in the radial direction. Additionally, the curved wave groove 10 formed of the hypotrochoidal curve and formed in the eccentric unit 3 is formed utilizing a side surface as a dead material portion of the eccentric unit 3 having the external teeth 3a on the outer peripheral portion thereof. This arrangement makes effective use of the dead material portion and contributes to reduced weight of the eccentric unit.

The hypotrochoid wave groove 10 formed in the one side surface 3b of the eccentric unit 3 has the number of waves greater than the number of waves of the epitrochoid wave groove 11 formed in the one side surface 4a of the rotary unit 4. The number of waves of the hypotrochoid wave groove 10 formed in the one side surface 3b of the eccentric unit 3, requiring an area equal to or greater than a predetermined area for effecting axial rotation and orbital revolution of the eccentric unit 3, can be made more than the number of waves of the epitrochoid wave groove 11 of the rotary unit 4. This arrangement makes even more effective use of the one side surface 3b of the eccentric unit 3 having a wide area and enables reduction in diameter and size of the rotary unit 4.

Additionally, the first thin-wall portion 3d is formed on the one side surface 3b of the eccentric unit 3 on an outer peripheral side with respect to the curved wave groove 10 and the second thin-wall portion 3e is formed on the other side surface 3c of the eccentric unit 3. Thus, the first and second thin-wall portions 3d and 3e achieve further reduction in weight of the eccentric unit 3. When viewed in a plane of projection perpendicular to the first rotary axis X1, the second thin-wall portion 3e has an area greater than the area of the first thin-wall portion 3d. The area of the second thin-wall portion 3e in the other side surface 3c having no curved wave groove of the eccentric unit 3 is further increased to achieve further reduction in weight.

Second Embodiment

A transmission device according to a second embodiment of the present invention will be described below.

In the second embodiment, the number of the curved wave grooves 11 formed in the one side surface 4a of the rotary unit 4 is greater by 2 than the number of the curved wave grooves 10 formed in the one side surface 3b of the eccentric unit 3. Specifically, the curved wave groove 10 formed in the one side surface 3b of the eccentric unit 3 is the epitrochoid wave groove having four waves and the curved wave groove 11 formed in the one side surface 4a of the rotary unit 4 is the hypotrochoid wave groove having six waves, with the number of internal teeth 1f on the inner peripheral wall of the cylindrical portion 1a and the number of external teeth 3a on the outer peripheral portion of the eccentric unit 3 in the first embodiment remaining unchanged.

In the second embodiment, Z1=80, Z2=70, Z3=4, and Z4=6 and thus the reduction ratio with the first rotary shaft 8 as the input shaft is 5/21. Rotation input from the first rotary shaft 8 is subjected to speed reduction to 5/21 and is output from the second rotary shaft 9.

Third Embodiment

Figure 4:
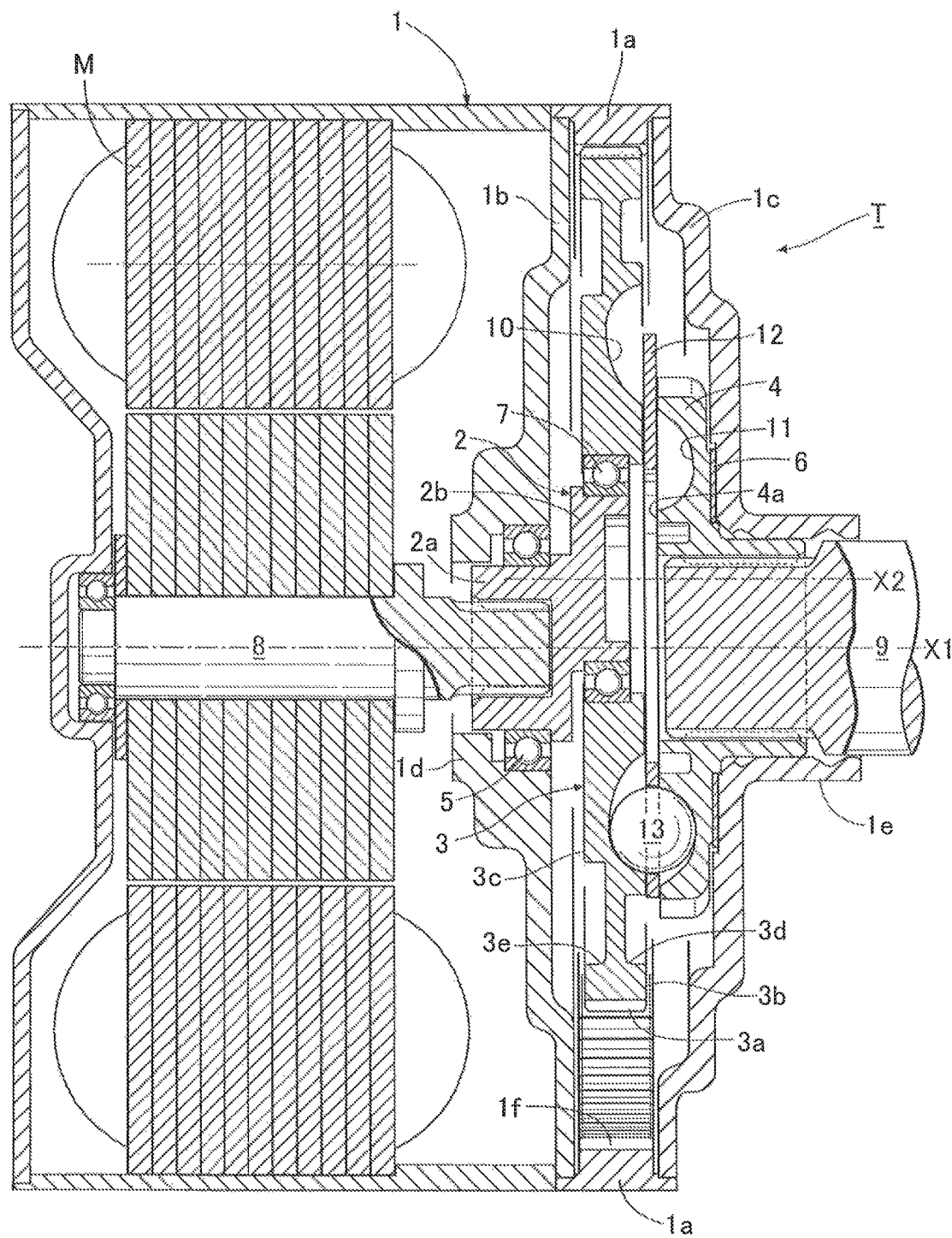
FIG. 4 is a longitudinal cross-sectional front view of a transmission device according to a third embodiment of the present invention, in which a main shaft portion of the transmission device according to the first embodiment of the present invention is mounted on an output shaft of a motor.

A transmission device according to a third embodiment of the present invention will be described below with reference to FIG. 4.

The third embodiment differs from the first embodiment in the following points. Specifically, a casing (housing) 1 covers a motor M as a drive unit. The one covering portion 1b of the housing 1 is formed as a bulkhead 1b that separates a transmission portion including a first speed change portion A and a second speed change portion B from the motor M.

In addition, the first rotary shaft is formed as a rotary shaft 8 of the motor M. The third embodiment has an arrangement similar to the first embodiment in other respects.

In the third embodiment, the transmission device including the drive unit can be made as one assembly so as to be formed compactly.

The first to third embodiments of the present invention have been explained above, but the present invention is not limited to the above embodiments and may be modified in a variety of ways as long as the modifications do not depart from the spirit and scope thereof.

For example, in the first to third embodiments, rotation input from the first rotary shaft 8 is to be output from the second rotary shaft 9. An arrangement may be possible in which rotation input from the second rotary shaft 9 is output from the first rotary shaft 8.

Additionally, in the first to third embodiments, the rolling elements 13 are each formed into a ball shape. The rolling elements 13 may each nonetheless be a roller shape or a pin shape.

The cylindrical portion 1a of the housing 1 is required only to allow the internal teeth 1f meshing with the external teeth 3a of the eccentric unit 3 to be formed on the inner peripheral wall thereof, and does not necessarily have to have a cylindrical shape.

Additionally, in the first to third embodiments, the curved wave groove 10 formed in the one side surface 3b of the eccentric unit 3 and the curved wave groove 11 formed in the one side surface 4a of the rotary unit 4 are the hypotrochoid wave groove and the epitrochoid wave groove. The present invention is not, however, limited to the foregoing arrangement. For example, one of the curved wave grooves may be a hypocycloid wave groove, while the other of the curved wave grooves may be an epicycloid wave groove.

The invention claimed is:

1. A transmission device, comprising:
    an eccentric shaft including a main shaft portion on a first rotary axis and an eccentric shaft portion on a second rotary axis disposed eccentrically with respect to the first rotary axis, the eccentric shaft portion being capable of revolving about the first rotary axis;
    an eccentric unit supported rotatably on the eccentric shaft portion and capable of revolving about the first rotary axis while rotating around the second rotary axis, the eccentric unit having external teeth formed on an outer peripheral portion thereof;
    a housing having an axial center on the first rotary axis and having internal teeth meshing with the external teeth of the eccentric unit on an inner peripheral wall thereof;
    a rotary unit capable of rotating about the first rotary axis and having one side surface opposed to one side surface of the eccentric unit;
    curved wave grooves formed in the one side surface of the eccentric unit and the one side surface of the rotary unit, respectively; and
    a plurality of rolling elements sandwiched between the curved wave grooves and moving along an orbit defined by the curved wave grooves, wherein
    at least the eccentric shaft, the eccentric unit and the housing form a first speed change portion and at least the eccentric unit, the rotary unit and the rolling elements form a second speed change portion, and
    the first and second speed change portions cause rotation of either one of the main shaft portion of the eccentric shaft or the rotary unit to be transmitted to the other of the main shaft portion of the eccentric shaft or the rotary unit with reduced or increased speed.

2. The transmission device according to claim 1, wherein the curved wave groove of the eccentric unit has waves that are greater in number than waves of the curved wave groove of the rotary unit.

3. The transmission device according to claim 1, wherein the eccentric unit has a first thin-wall portion formed on the one side surface on an outer peripheral side with respect to the curved wave groove and a second thin-wall portion formed on the other side surface of the eccentric unit, and when viewed in a plane of projection perpendicular to the first rotary axis, the second thin-wall portion has an area greater than an area of the first thin-wall portion.

4. The transmission device according to claim 2, wherein the eccentric unit has a first thin-wall portion formed on the one side surface on an outer peripheral side with respect to the curved wave groove and a second thin-wall portion formed on the other side surface of the eccentric unit, and when viewed in a plane of projection perpendicular to the first rotary axis, the second thin-wall portion has an area greater than an area of the first thin-wall portion.

* * * * *